United States Patent [19]
Jochimsen

[11] Patent Number: 4,639,736
[45] Date of Patent: Jan. 27, 1987

[54] INK JET RECORDER

[75] Inventor: Dieter Jochimsen, Winchester, Mass.

[73] Assignee: Iris Graphics, Inc., Stoneham, Mass.

[21] Appl. No.: 753,454

[22] Filed: Jul. 9, 1985

[51] Int. Cl.⁴ .............................................. G01D 15/18
[52] U.S. Cl. .................................... 346/75; 346/140 R
[58] Field of Search ................................... 346/75, 140

[56] References Cited

U.S. PATENT DOCUMENTS

| | | | |
|---|---|---|---|
| 3,416,153 | 12/1968 | Hertz | 346/75 |
| 3,916,421 | 10/1975 | Hertz | 346/75 |
| 3,975,740 | 8/1976 | Distler | 346/75 |
| 4,234,884 | 11/1980 | Uedder | 346/75 |
| 4,277,790 | 7/1981 | Heibein | 346/75 |
| 4,338,610 | 7/1982 | Sellen | 346/75 |

Primary Examiner—Joseph W. Hartary
Attorney, Agent, or Firm—Cesari and McKenna

[57] ABSTRACT

An ink jet recorder of the continuous jet type has a mounting block defining a reference surface. Nozzle units from which the ink streams are ejected are releasably keyed to the reference surface. An ink reservoir supplies electrically conductive ink to the nozzle units which selectively charge segments of the ink streams issuing from the nozzle units. Each unit also includes provision for accurately aiming the ink stream in both the x and y directions using simple knob controls. A deflection unit also releasably keyed to the reference surface downstream from the nozzle units.

The ink stream is directed through a deflection unit mounted on the reference surface. Mating members are provided in said mounting block which corresponds with mating members on the deflection unit. This unit generates an electrical field which deflects the selectively charged segments of the ink stream issuing from the nozzle unit, from their predetermined paths so that they do not reach the recording medium; the undeflected portions of the ink streams form the printing on the medium. The deflection unit also includes provision for removing extraneous ink from the regions of the deflection field so as to minimize background coloration in the printing on the medium. A charged mist shield is provided in said deflection unit to further attract extraneous ink in and about said deflection unit. Vacuum means are provided to withdraw extraneous ink from said deflection unit, nozzle unit, and mist shield.

54 Claims, 6 Drawing Figures

INK JET RECORDER

This invention relates to an ink jet recorder and more particularly to an ink jet recorder which is capable of high resolution and faithful reproduction of images, yet permits user maintenance, replacement, installation and adjustment of the ink jet nozzle and deflection units. The invention also relates to a nozzle unit having an improved reliability, as well as to a deflection unit which minimizes background coloration of the recorded images.

BACKGROUND OF THE INVENTION

Ink jet recorders have been the subject of an intense development effort for a number of years. The recorders fall generally into two categories, namely drop-on-demand and continuous stream types. The present invention is directed to the latter type of recorder whose operation is described in detail in U.S. Pat. No. 3,416,153. In general, a continuous ink jet recorder produces a liquid jet by pumping the ink under high pressure through a capillary nozzle unit and directing the jet along a path toward a recording medium such as a paper sheet. As the jet issues from the nozzle it is selectively charged. A transverse electric field deflects the charged portions of the ink jet from the path into a gutter so that they are prevented from reaching the recording medium. The uncharged, and thus undeflected, portions of the jet reach the recording medium and form the printing thereon.

In continuous jet printers, the voltage of the deflection field is quite high. Particles from the ink stream which rebound upon impact with the recording surface instead of adhering to that surface, as well as particles from the ink stream which were deflected, cause an ink mist to develop in the region of the field. The ink mist particles of the different color inks are entrained in the segments of the ink streams that reach the recording surfaces and thus contaminate the color printing on that surface giving it a pronounced background coloration. This ink mist also reduces the voltage of the deflection field and sometimes causes arcing in the field region resulting in improper deflection of the ink streams and irregular printing on the recording surface.

In addition, prior printers of this type are plagued by clogging of their nozzle units by the recording liquid while the ink jet recorder is in operation. This gives rise to increased down-time and increased nozzle relacement costs. Further, none of the prior recorders of which we are aware have permitted simple adjustments by the user of the directions of the ink streams. Nor do they have low cost nozzle and deflection units which are easily removed and positioned.

SUMMARY OF THE INVENTION

It is therefore an object of the invention to provide an improved ink jet recorder.

Another object is to provide improved units for use in such a recorder.

Another object is to provide a recorder whose nozzle and deflection units are quite reliable yet are easily repaired or replaced in the event that becomes necessary.

The nozzle units of this recorder are less prone to clogging and they can be targeted easily by the user to produce high quality printing on the recording surface which is free of background colorations.

Thus, this recorder incorporates a set of nozzle units in modular form each of which is adjustable and replacable separately from the others. The deflection unit is also made as a module which is replacable as a unitary structure. The nozzle units and the deflection unit are all separately keyed to a mounting block so that they can be installed and replaced quite easily. The mounting block also has all the necessary electrical and pneumatic connections for the nozzle units and these are automatically connnected to the units when the units are keyed to the mounting block. Likewise, the mounting block has all necessary pneumatic connections for the deflection unit, and these are automatically connected to the unit which the unit is keyed to the mounting block.

The present invention accordingly comprises the features of construction, combinations of elements, and arrangements of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

DETAILED DESCRIPTION OF THE PREFERRED EMBODIMENTS

Figure 1:
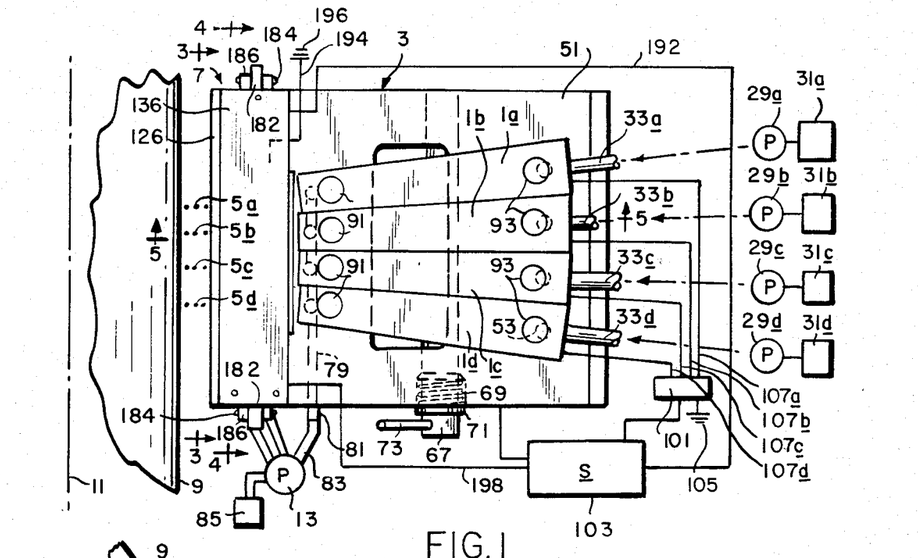
FIG. 1 is a top plan view of an ink-jet recorder embodying the invention.
Figure 2:
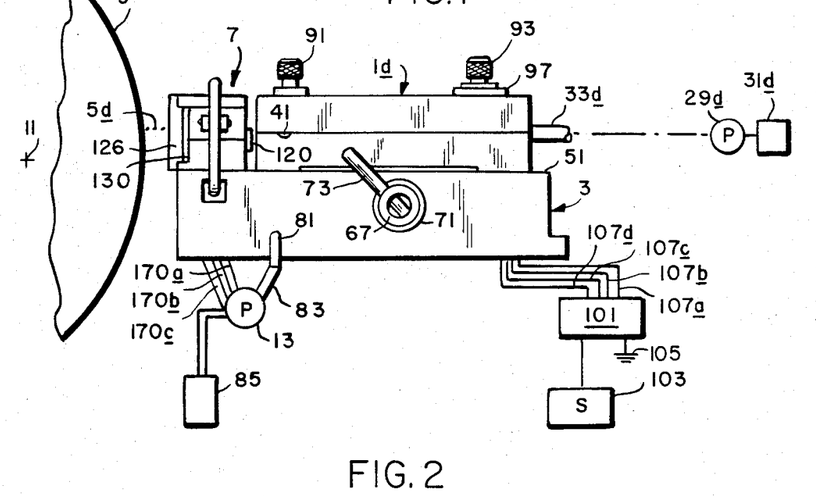
FIG. 2 is a side elevational view thereof.

Referring now to FIGS. 1 and 2, an ink jet recorder includes four nozzle units 1a–1d which are a mounted on a mounting block 3. Ink streams or jets 5a–5d are projected from the nozzle units 1a–1d through a deflection unit 7 toward a recording surface 9 which in illustrated recorder is a paper sheet wrapped around a rotary drum. Some segments of each of the ink streams 5a–5d are charged in the corresponding nozzle units 1a–1d. These charged segments are deflected downward into a gutter (not shown) by an electric field in the deflection unit 7 and discarded. The uncharged segments of the ink streams 5a–5d pass through deflection unit 7 to the recording surface 9 forming printing thereon. The surface 9 rotates about a central axis 11, while the mounting block 3, with the nozzle units 1a–1d and deflection unit 7 mounted thereon, is moved in the longitudinal direction relative to the recording surface (ie. parallel to the axis 11). This causes the ink streams 5a–5d to sweep over the recording surface in a raster type of operation.

As is customary in recorders of this type, one of the ink streams is black and the other three have the three primary subtractive colors, i.e. cyan, magenta and yellow. Thus by selectively charging various segments of the ink streams and thereby controlling the color densities of corresponding segments of the raster lines traced by them, the colored inks can be laid down one over the other so as to imprint a full-color image on the recording surface 9. A vacuum system, described in detail below, incorporates a suction pump 13 to evacuate extraneous ink from the nozzle units 5a–5d and the deflection unit 7.

Figure 5:
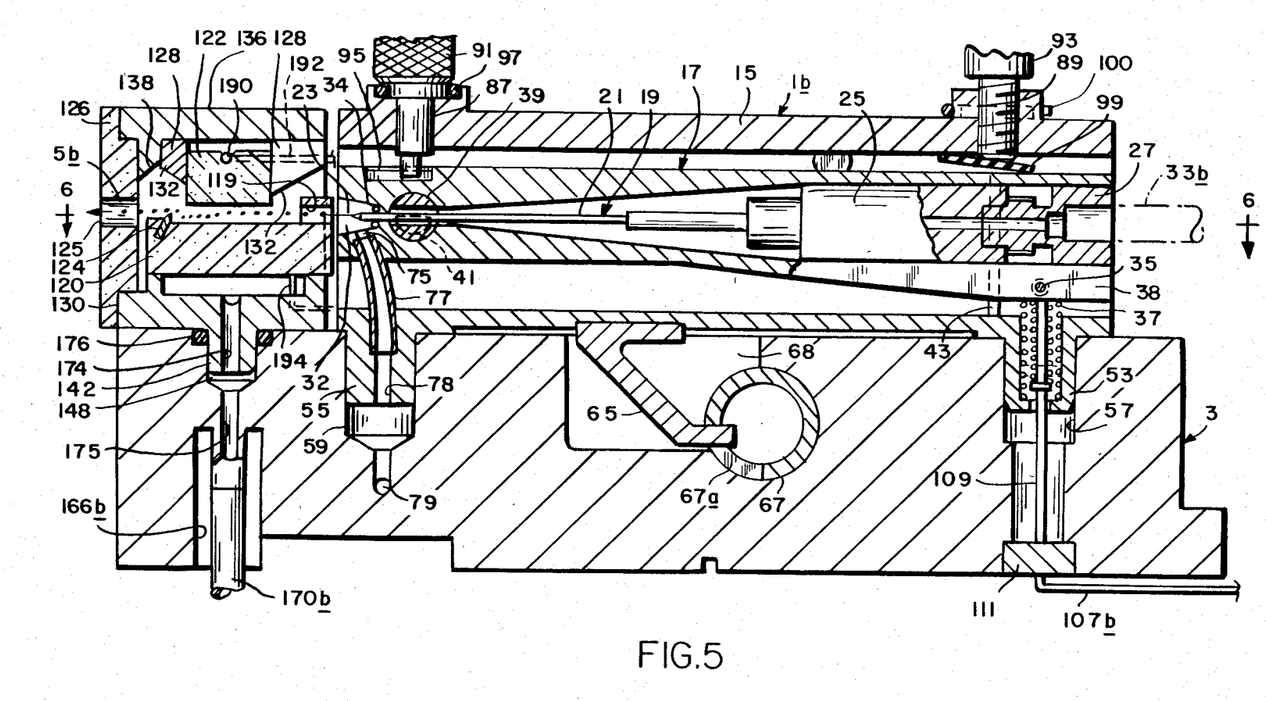
FIG. 5 is a similar view on a larger scale thereof taken through plane 5—5 of FIG. 1.

Referring now to FIGS. 1 and 5, nozzle units 1a to 1d are all more or less identical. Therefore, we will describe only one unit, namely unit 1b in detail. It includes a tubular capillary housing 15 having an elongated capillary holder 17 mounted axially therein. A capillary 19, consisting of a brass sheathing 21 and a glass capillary containted therein and ending in an exposed tip 23 mounted on one end and a stainless steel barrel 25 mounted on its opposite end, is retained within holder 17. A charge adapter 27 is plugged into the free end of barrel 25 inside holder 17. As best seen in FIG. 1, a pump 29b pumps an electrically conductive ink from a reservoir 31b through a conduit 33b to the charge adapter 27. From the adapter 27 the ink flows through the barrel 25 and the tube 21 to tip 23. The ink leaves the tip 23 in a stream 5b which shortly breaks up into individual droplets.

As shown in FIG. 5, the capillary 19 is inserted into capillary holder 17 from the right end in that figure until barrel 25 seats on an internal shoulder provided in the capillary holder. The inside wall of the holder is tapered to guide the nozzle end of tube 19 into a frustoconical ejection chamber 32 formed at the left end of the capillary holder 17. An electrically conductive 0-ring 34 is provided between the tube and the chamber wall to seal the joint between the two. After the capillary 19 is inserted into holder 17, the charge adapter is threaded into the barrel end of the capillary. The capillary 19 is secured there by tightening of a screw 35 received in two registering threaded apertures 36 in the capillary holder 17 which are separated by a slot 38 in the holder.

Figure 6:
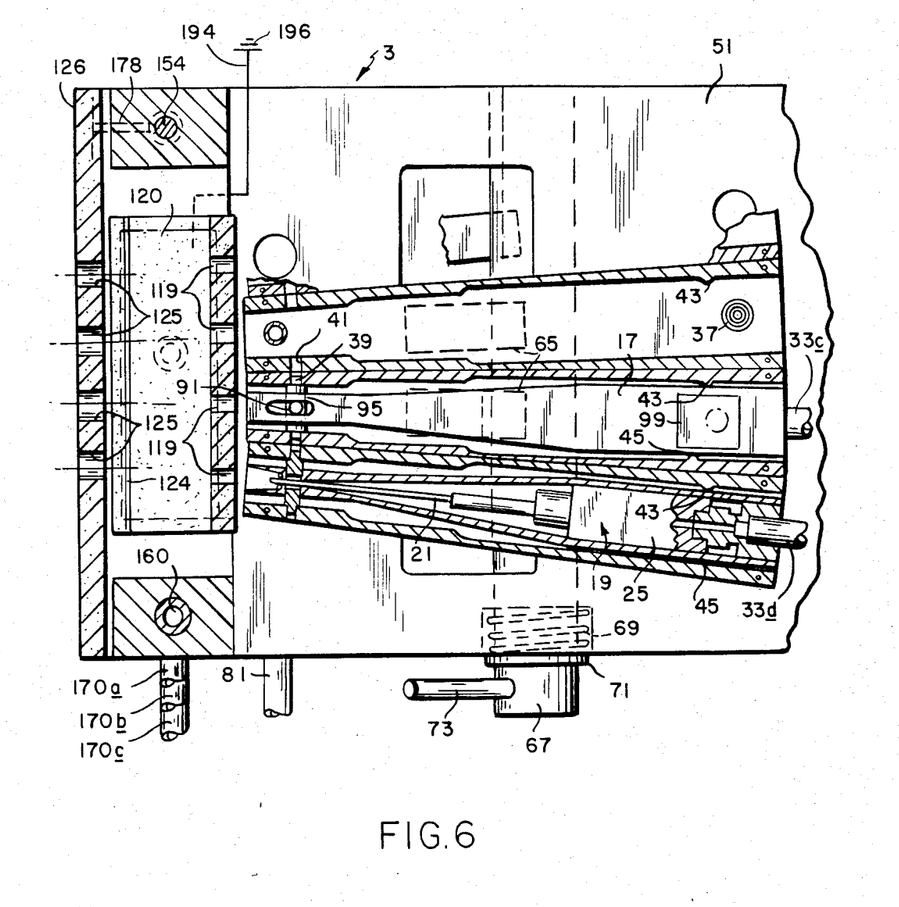
FIG. 6 is a sectional view taken through plane 6—6 of FIG. 5.

As best seen in FIGS. 5 and 6, the capillary holder 17 is supported within the capillary housing 15 at its rear (i.e. right) end by a spring 37 which extends up from base 3 through an opening into wall of capillary housing 15 and engages under the holder 17. The forward (i.e. left) end of the capillary holder 17 is supported within housing 15 by a pin 39 which extends transversely through the holder 17, the opposite flanged ends of the pin being received in apertures 41 formed in the opposite side walls of the capillary housing 15. Further, lateral support is provided to the capillary holder 17 by pin 39, an interior projection 43 on a sidewall of housing 15 adjacent its right hand and a spring 45 (FIG. 6) fixed to the other housing side wall directly opposite the projection 43. When holder 17 reposes in the housing as shown, spring 45 presses it against projection 43 thereby fixing the lateral position of the holder.

The housing 15 is positioned and keyed to the upper surface 51 of block 3 which constitutes a reference surface. More particularly, projections 53 and 55 project down from the underside of housing 15 to apertures 57 and 59 formed in the mounting block 3.

Referring now to FIGS. 1,2,5 and 6, the capillary housing 15 is releasably secured to the reference surface 51 by an arm 65 which extends down from the bottom wall of the housing into a cavity provided in the top wall of block 3. Arm 65 is angled rearwardly (i.e. to the right in FIG. 5) parallel to the longitudinal axis of housing 15. Its end engages in a slot 67a of an elongated transverse tube 67 rotatively mounted in block 3 so that it intercepts cavity 68. The arm 65 is positioned within cavity 68. Tube 67 is rotatable between a first angular position shown in FIG. 5 wherein the upper edge of the tube slot 67a engages and holds the end of arm 65 against the bottom of block cavity 68 thereby clamping the nozzle unit 1b to the block and a second position wherein the lower wall of tube slot 67a engages the underside of the arm and the nozzle unit as a whole may be moved away from block 3. The tube is biased to its first, i.e., clamping position by a torsion spring 69 which encircles the tube at one end, one wall of the spring being retained by retainer 71 on the tube and the other being anchored to block 3. Thus by rotating tube 67 clockwise from its first to its second position, using its handle 73, all of the units 11 are jacked away from block 3. Those needing repair can be removed and replaced with operative units. Then all of the units are clamped to the block by rotating of the tube counterclockwise under the action of said spring 69 to its position shown in FIG. 5.

Referring now to FIGS. 1, 2, and 5, a passage 75 leads from ejection chamber 32 of capillary holder 17 to a flexible tube 77 which communicates with an axial passage 78 in housing projection 55 when the housing is clamped to block 3 as aforesaid, passage 78 communicates with a conduit 79 which leads from the corresponding block aperture 59 to a port 81 in the mounting block 3, as shown in FIG. 1. An external conduit 83 connects the port 81 with the suction pump 13 which draws a vacuum to suck surplus or extraneous ink from the ejection chamber 32 of each capillary holder 17 to a waste reservoir 85.

Referring again to FIG. 5, the present recorder includes means to manually change the orientation of the capillary 19 within the capillary housing 15 so that the path of the ink stream produced by each nozzle unit is altered. More particularly, a vertical hole 87 is provided in the upper wall of housing 15 adjacent its forward or nozzle end. A pin 91 which is rotatively received in that hole has a lower end which is formed as an eccentric which extends into a slightly undersized aperture in the capillary holder 17. A similar aperture is positioned in an adjacent face of the capillary holder 17 creating an L-shaped cavity into which the eccentric end of pin 91 extends. Thus, a wall 95 of the capillary holder 17 between the aforesaid adjacent apertures provides a compression force on the pin 91. An o-ring 97 is engaged around pin 91 in a countersunk portion of hole 87, such that the turning of the pin is inhibited but not prevented. Rotation of pin 91 moves capillary holder 17 and, thus the capillary 19, therein, laterally within its housing 15 about pivot point defined by the housing projection member 43 without backlash or other undesirable consequences due to flexing of parts. Thus, by rotating pin 91 in one direction or the other, the ink stream can be aimed in the transverse direction, i.e. along the X axis.

Still referring to FIG. 5, a second vertical hole 89 is present in housing 15 adjacent its rear or right hand end. This hole is threaded to accept threaded pin 93. The pin 93 contacts a flexible, insulating strip 99 which is secured at its upper end to the upper wall of housing 15 and extends downward and along the top of capillary holder 17. The spring 37 described previously is positioned within housing projection 53 and extends upward and contacts the capillary holder 17 approximately opposite the pin 93. It thus urges the holder 17 upwardly against the pin 93. An anti-rotation spring clip 100 is provided around the upwardly raised portion aroung aperture 89 and contacts the pin 93 through a void in said upwardly raised portion to inhibit unintended movement of the pin 93.

Rotation of pin 93 results in the pivoting of the capillary holder 17, and thus the capillary 19 therein, about a pivot point defined by the pin 39 that supports the nozzle end of this holder 17. The strip 99, further, operates as a insulating member preventing the circular motion of the pin 93 from being transmitted to the capillary holder 17. Thus by rotating the pin in one direction or the other, the ink stream ejected from the capillary 19 can be aimed vertically along the y axis.

Thus, using both pins 91 and 93, the ink stream can be aimed in two mutually perpendicular x and y directions that are orthogonal to the longitudinal axis of the nozzle unit. Preferably, the outer ends of the pins are formed as knobs so that these adjustments can be made without requiring any tools or other special apparatus.

Referring now to FIGS. 1, 2 and 5, a switch controller 101 selectively charges or discharges the ink in the capillary. The switch controller 101 is connected to an electrical source 103 and to ground at 105 which it selectively connects to conductors 107a–107d leading to the nozzle units 1a to 1d. As best seen in FIG. 5, a rod-like spring-loaded contact 109 is mounted to each capillary holder 17. It extends through housing projection 53 into the aperture 57 in block 3. Contact 109 is spring-loaded downwards into engagement with an electrical contact 111 mounted at the bottom of aperture 57. The four aforementioned conductors 107a–107d are connected separately to the contacts 111 of the four nozzle units 1a to 1d. Thus, using switch controller 101, a charge may be applied selectively to or discharged from segments of the ink while the ink is passing through each of the nozzle units. In this connection, it should be noted that the stainless steel charge adaptor 27, the stainless steel barrel 25 and conductive O-ring 34 all contact the capillary holder 17 which is made of a conductive plastic and to which electrical contact 109 is connected.

Referring now to FIGS. 1, 5 and 6, the deflection unit 7 of the recorder is mounted on reference surface 51 of mounting block 3 downstream from the ejection end of the nozzle units 1a–1d. The ink streams 5a–5d pass through corresponding apertures 119 in an upwardly extending wall of a ground electrode 120. The apparatus is positioned such that the "droplet formation point" of the ink streams 5a–5d occur while the ink streams are passing through these apertures. The four separate ink streams 5a–5d then enter an intense electrical field generated between the ground electrode 120 and a deflection electrode 122 whose polarity is such as to repel the selectively charged segments of the ink streams 5a–5d. Thus, the charged segments of the ink streams 5a–5d are deflected toward the ground electrode 120, while passing through the electric field, and these deflected portions of the ink streams are then inhibited or otherwise stopped by a knife edge 124 mounted to the top of electrode 120 and which forms a gutter for the ink. Undeflected portions of the ink streams 5a–5d exit the electric field and pass through four similar apertures 125 in a mist shield 126 which is positioned on the forward edge of the deflection unit 7. Only the ink droplets passing through the apertures in mist shield 126 strike recording surface 9. Extraneous ink building up on the mist shield 126, deflection electrode 122, and ground electrode 120 is removed therefrom by the action of suction pump 13, as described hereafter.

The deflection unit 7 includes an upper support 128 positioned on a base 130 along with ground electrode 120. The base 130 is, in turn, positioned on mounting block 3. The upper support 128 supports deflection electrode 122. Lower, exposed faces 132 of the upper support 128 are tapered toward the deflection electrode 122 so that extraneous ink accumulating thereon is urged toward the deflection electrode 122. Lips 134 are also provided on the upper support 128 to urge ink forming thereon to migrate downward and thus reduce the potential for arcing that is commonly associated with the buildup of extraneous ink.

An airtight seal is provided over the upper support 128 by a cover 136 which is secured on the support. The mist shield 126 is secured along its upper edge to the cover 136 and along its lower edge to the base 130. The cover 136 is provided with a downwardly-forwardly tapered projection 138 between the upper support 128 and the mist shield 126 which encourages extraneous ink forming thereon to go to the mist shield 126.

Figure 3:
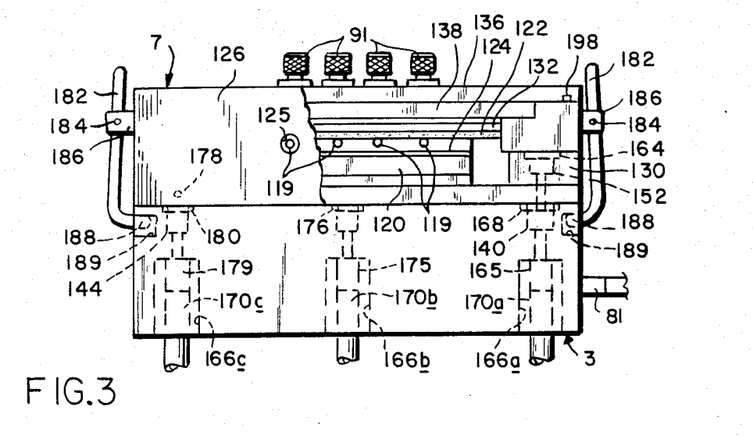
FIG. 3 is a front elevational view with a part broken away taken through plane 3—3 of FIG. 1.
Figure 4:
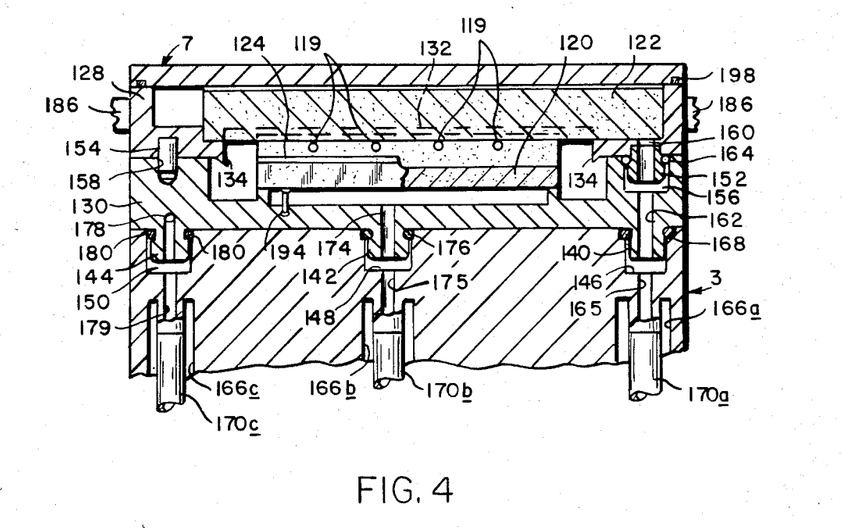
FIG. 4 is a sectional view thereof with a part broken away taken through plane 4—4 of FIG. 1.

As shown in FIGS. 2, 3, and 4, the base 130 is located on the reference surface 51 by projections 140, 142, 144 extending down from base 130 into corresponding apertures 146, 148, 150 in the top of mounting block 3. The upper support 128 is, in turn, located on the base 130 by projections 152 and 154 extending down from support 128 into corresponding apertures 156 and 158 in the base 130.

Deflection electrode 122 receives the vacuum drawn by suction pump 13 through a vertical passage 160 which abuts the deflection electrode 122 and extends down through projection 152 and communicates with a passage 162 through projection 140 in base 130. A gastight fit between the projection 152 and aperture 156 is provided by an o-ring 164 engaged around projection 152. Passage 162 extends through the projection 140 and communicates with a conduit 165 which extends from aperture 146 into a couter-bored aperture 166a extending upwardly from the bottom of the block 3. A gas tight fit is provided between male projection 140 and the aperture 146 by o-ring 168 encircling projection 140 and engaging the wall of the aperture 146. The conduit 165 is connected to the vacuum pump 13 through a conduit 170a.

The ground electrode 120 receives the vacuum drawn by pump 13 by way of a conduit 174 which abuts the open space beneath the ground electrode 120 which is sealed. Conduit 174 extends down through projection 142 and communicates with a conduit 175 which extends from aperture 148 into counter-bored aperture 166b, which extends upwardly from the bottom of said block 3. A gas tight fit is provided between the projection 142 and the aperture 148 wall by an o-ring 176 encircling the projection 142. The conduit 175 is connected via a conduit 170b to the vacuum pump 13.

Extraneous ink is extracted from the mist shield 126 to the suction pump 13 through a conduit 178 which has one end abutting the mist shield 126 as shown in FIG. 6. That conduit extends through base 130 and down through projection 144 so as to communicate with conduit 179 which extends from the aperture 150 into a counterbored aperture 166b which extends upwardly from the bottom of the block 3. A gas tight fit between the male member 144 and aperture 150 is provided by an o-ring 180 encircling projection 144 ensures a gas-tight fit at that location. The conduit 179 is connected via a conduit 170c to the vacuum pump 13.

As shown in FIGS. 1 to 3, a pair of levers 182 are pivotally mounted to opposite sides of the deflection unit 7 on pivot pins 184 which are secured between members 186 projecting laterally from the unit. Each lever 182 an inwardly turned foot 188 which is adapted to engage in a recess 189 provided in the adjacent side wall of the mounting block 3. A spring (not shown) is secured at one end to the deflection unit 7 and its other end to the lever 182 in a known manner such that the upper end of each lever 182 is urged away from the deflection unit 7. Thus, the spring loaded levers operate to releasably clip the deflection unit 7 to the mounting block 3. When the upper ends of the levers are pressed toward unit 7, their feet are retracted from the block apertures whereby the deflection unit 7 may be removed from the mounting block 3.

An electrical contact 190 is positioned along the upper edge of the deflection electrode 122. It is connected at one end to an electrical conductor 192 which is, in turn, connected to the voltage source 103 so that an electrical potential of the polarity which repels the charged portions of the ink streams 5a–5d is applied to the deflection electrode 122. Another electrical conductor 194 connected to ground at 196 leads to the ground electrode 120. A third electrical conductor 198 is connected at one end to the source 103 and at the opposite end to the mist shield 126, whereby the mist shield 126 is electrically charged so as to attract the extraneous ink mist.

The operation and use of the ink jet recorder of the present invention involves a flow of conductive ink under pressure generated by the pumps 29a–29d from the ink reservoirs 31a–31d to the nozzle units 2a–2d through passage 33a–33d. The ink pushed by the pumps 29a–29d reaches the charge adaptors 9 through passages 33a–33d. The conductive charge adaptors are secured in the conductive capillary holders 17. The ink is then delivered to the capillaries 19. Electrical current of between 30 and 200 volts are selectively imparted to the ink as it passes through the capillaries 19 from the electrical source 103 by way of the switching means 101 which selectively connects the electrical contact 111 to the ground conductor 105 or to the source 103 via the electrical conductors 107a–107d.

The ink streams 5a–5d which are ejected from the capillaries 19 enter the deflection unit 7 which is positioned so that the droplet formation point occurs while the ink streams 5a–5d are passing through the apertures in the ground electrode 120. The droplets of the ink streams 5a–5d then enter an electrical field generated between the deflection electrode 122 and ground electrode 120. A high intensity as a high electrical potential between 500 and 2,200 volts is applied to the deflection electrode from source 103, while the ground electrode 120 is maintained at ground potential. The electrical field thus generated causes the portions of the ink streams 5a–5d, which have been selectively charged, to be repelled by the deflection electrode 122 and directed towards the ground electrode 120 and thereby into the knife edge 124. The knife edge 124, which in the preferred embodiment is an ultra thin razor blade, is set at a substantial angle between 45° and 75° to the ground electrode 120 and extends upward to a height just below the predetermined paths of the ink streams 5a–5d to the recording surface 9. Ink building up on the angled knife edge 124, is thereby urged downward along the opposite faces of the knife edge 124 toward the ground electrode 120.

Ink deflected into the knife edge 124 is also dispersed upon impact in the form of ink mist into the region in and about the deflection unit 7. The ground electrode 120, deflection electrode 122, and mist shield 126 are therefore preferably formed of a porous, electrically conductive material such as sintered carbon, so that extraneous ink (e.g. the ink mist formed within the deflection unit as well as ink mist condensate, misaimed ink, the ink deflected by the knife edge 124 not being dispersed or other ink not following the predetermined path) which strikes or otherwise contacts the deflection electrode 122, ground electrode 120, or mist shield 126, is removed from the deflection units by the action of the pump 13. Further, as previously described the internal structure of the deflection unit 7 encourages migration of extraneous ink to the ground electrode 120, deflection electrode 122 and mist shield 126.

Undeflected ink which follows the predetermined trajectory toward the recording suface 9 then passes through the aperture in the mist shield 126 and strikes the recording surface 9 forming the printing thereon. Additional extraneous ink may be formed upon impact of segments of the ink streams 5a–5d with the recording surface 9 because part of the ink may rebound therefrom. Such extraneous ink is collected by the mist shield 126, from which it is extracted by the action of the pump 13 in a manner described previously.

The present recorder disclosed herein thus provides improved resolution by reducing the background color effects due to the presence of extraneous ink. Yet the recorder is simple to make and maintain in that its deflection and nozzle units can be installed, and the latter aligned quite easily, Accordingly, it allows nontechnical persons to intervene and rectify problems with the recorder. The simplicity of the recorder also allows greater efficiency in mass producing of its components. A further advantage is gained from providing an frustoconical ink ejection chamber having the described flared construction to reduce clogging in the nozzle unit and the buildup of extraneous ink. The aforementioned improved geometry of the deflection unit likewise minimizes the problems associated with buildup of extraneous ink.

It will thus be seen that the objects set forth above, among those made apparent from the preceding description, are efficiently attained and that certain changes may be made in the above arrangement of the components or other alterations apparent to those skilled in the art, without departing from the scope of the invention, it is intended that all matter contained in the above description shall be interpreted as illustrative and not in a limited sense.

What is claimed:

1. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit and means for deflecting charged ink from said path, said recorder comprising:
   (a) a mounting block having a reference surface on said mounting block;
   (b) a first port in said mounting block for connecting said mounting block to a suction pump;
   (c) corresponding first and second mating means in said mounting block and said nozzle unit, respectively, for positioning said nozzle unit in an operative position on said reference surface;
   (d) a first conduit in said mounting block connecting said first port with said first mating means;

(e) a vacuum guide in said nozzle unit having an inlet end in the region in which the ink is ejected from said nozzle unit; and (f) a second conduit in said nozzle unit connecting an outlet end of said vacuum guide with said second mating means whereby said second conduit communicates with said first conduit and the suction pump is connected to said vacuum guide.

2. An ink jet recorder according to claim 1 further comprising corresponding third and fourth mating means in said mounting block and said nozzle unit, respectively, for positioning said nozzle unit in an operative position on said reference surface.

3. An ink jet recorder according to claim 2 wherein said means for selectively charging said ink includes:

(a) an electrical conductor connected to an electrically conductive portion of said nozzle unit contacting the ink therein so that the ink therein can be charged by application of a suitable electrical potential from said source to said conductor;

(b) a first electrical contact positioned in said fourth mating means and connected to said electrical conductor;

(c) a second electrical contact positioned opposite said first contact in said third mating means such that said first and second contacts abut each other; and (d) a selectively controllable switching means connecting said second electrical contact with a source and a ground potential, such that an electrical charge can be selectively imparted to and removed from said ink in said nozzle unit by said electrical conductor through said first and second electrical contacts.

4. An ink jet recorder according to claim 2, wherein said second and fourth mating means are hollow, male members extending from said nozzle unit and said first and third mating means are apertures positioned within said mounting block and corresponding with said second and fourth male members, respectively.

5. An ink jet recorder according to claim 1, further comprising means for releasably clamping said nozzle unit to said mounting block, said clamping means including:

(a) a cavity in said mounting block extending downward from said reference surface of said mounting block;

(b) an arm fixed to said nozzle unit and extending in to said cavity and generally parallel with said reference surface;

(c) an elongated tubular member extending through said mounting block and having a cam portion positioned within said cavity;

(d) said tubular member being rotatable between a first and second position; and (e) the cam portion of said tubular member when in said first position engages said arm and thereby clamps said nozzle unit to the reference surface of said mounting block, and when said cam portion is in said second position said nozzle unit is released from said mounting block.

6. An ink jet recorder according to claim 5, further comprising:

(a) a spring connected to said tubular member to urge and releasably hold said tubular member in its first position.

7. An ink jet recorder according to claim 1 further comprising:

(a) means for selectively altering the orientation of the portion of said nozzle unit from which the ink is ejected in two directions othogonal to the longitudinal axis of said nozzle unit whereby the path of said ink stream is altered.

8. An ink jet recorder according to claim 7, wherein said nozzle unit includes an outer capillary housing, a capillary holder positioned within said capillary housing and a capillary secured within said capillary holder, said capillary having an ejection end from which said ink stream is ejected and said altering means alters the orientation of said ejection end.

9. An ink jet recorder according to claim 8, wherein said means for selectively altering the orientation of the ejection end of said capillary in one of the orthogonal directions includes:

(a) a aperture in said capillary housing;

(b) a first elongated slot in said capillary holder in a direction parallel with the longitudinal axis of said capillary housing and opposite said capillary aperture;

(c) an eccentric pin having a stump portion fitted within said aperture and the eccentric portion of said pin extending from said stump portion rotatably fitted within said elongated slot; and (d) pivot means positioning said capillary holder within said capillary housing such that, when said eccentric pin is rotated, said capillary holder is pivoted on the pivot point defined by said pivot means and thereby the ejection end of said capillary is moved transverse to the longitudinal axis of said capillary housing.

10. An ink jet recorder according to claim 9, wherein said means for selectively altering the orientation of the ejection end of said capillary in one of the orthogonal directions further includes:

(a) a second elongated slot in said capillary holder positioned on an adjacent face to said first slot forming a L-shaped cavity in said holder with said first slot and a flexible wall between said first and second slot which exerts a compression force on said pin.

11. An ink jet recorder according to claim 8, wherein said means for selectively altering the orientation of the ejection end of said capillary in one of the orthogonal directions includes:

(a) a threaded aperture in said capillary housing;

(b) a threaded pin mounted in said aperture with lower portion contacting said capillary holder and the upper portion extending through said capillary housing;

(c) a flexible member secured at one end to said housing extending between said capillary holder and said pin; and (d) pivot means pivotally securing said capillary holder within said capillary housing so that when said pin is rotated said capillary holder is pivoted on the pivot point defined by said pivot means such that the ejection end of said capillary is moved transverse to the longitudinal axis of said capillary housing.

12. An ink jet recorder according to claim 8, wherein said means for selectively altering the orientation of the ejection end of said capillary includes:

(a) an aperture in said capillary housing;

(b) an elongated cavity in said capillary holder in a direction parallel with the longitudinal axis of said capillary housing and opposite said aperture in said capillary housing;

(c) an eccentric pin having a stump portion fitted within said aperture and the eccentric portion of said pin extending from said stump portion and into said elongated cavity, and said eccentric portion being rotatably fitted within the elongated cavity of said capillary holder;

(d) first pivot means positioning said capillary holder within said capillary housing such that, when said eccentric pin is rotated, said nozzle unit is pivoted on the pivot point defined by said pivot means whereby the ejection end of said capillary is moved in a transverse direction to the longitudinal direction of said capillary housing.

(e) a threaded aperture in said capillary housing;

(f) a threaded pin mounted in said aperture with the lower portion contacting said nozzle unit and the upper portion extending beyond said capillary housing, such that the longitudinal axis of said capillary housing, the central axis of said threaded pin and said eccentric pin are all in parallel planes;

(g) a spring secured in said housing contacting said capillary holder positioned to keep said capillary holder and said pin in contact with each other; and (h) second pivot means provided for pivotally securing said capillary holder within said capillary housing so that as said pin is rotated with respect to said threaded aperture said capillary holder is pivoted on the pivot point defined by said pivot means whereby the ejection end of said capillary is moved in a transverse direction to the longitudinal direction of said capillary housing, thereby providing selective alteration of the orientation of the ejection end of said capillary in two orthogonal directions to the transverse axis of said capillary housing by rotation of said eccentric pin and said threaded pin.

13. An ink jet recorder according to claim 12, wherein said first pivot means includes a extending member on the inner wall of said capillary housing and contacting said capillary holder and a spring member positioned opposite said extending member urging said capillary holder into contact with said extending member such that the capillary holder pivots about said extending member and said second pivot means includes a nozzle holder secured to said capillary holder and having flanges resting on walls of oversized apertures in said capillary housing such that the capillary holder is pivoted on said flanges.

14. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit and means for deflecting charged ink from said path, said recorder comprising:

(a) a mounting block having a reference surface;

(b) said nozzle unit positioned on the reference surface;

(c) said nozzle unit including an outer capillary housing, a capillary holder positioned within said capillary housing and a capillary, having an ejection end from which said ink stream is ejected, secured within said capillary holder; and (d) means for selectively altering the path of said ink stream in two othogonal directions to the longitudinal axis of said nozzle unit by pivoting said capillary holder within said housing to thereby vary the orientation of the region in which the ink is ejected from said nozzle unit.

15. An ink jet recorder according to claim 14, wherein said means for selectively altering the orientation of the ejection end of said capillary in one of the orthogonal directions includes:

(a) an aperture in said capillary housing;

(b) a first elongated slot in said capillary holder in a direction parallel with the longitudinal axis of said capillary housing and opposite said capillary aperture;

(c) an eccentric pin having a stump portion fitted within said aperture and the eccentric portion of said pin extending from said stump portion rotatably fitted within said elongated slot;

(d) pivot means positioning said capillary holder within said capillary housing such that, when said eccentric pin is rotated, said capillary holder is pivoted on the pivot point defined by said pivot means and thereby the ejection end of said capillary is moved transverse to the longitudinal axis of said capillary housing.

16. An ink jet recorder according to claim 15, wherein said means for selectively altering the orientation of the ejection end of said capillary in one of the orthogonal directions further includes:

(a) a second elongated slot in said capillary holder positioned on an adjacent face to said first slot forming a L-shaped cavity in said holder with said first slot and a flexible wall between said first and second slot which exerts a compression force on said pin.

17. An ink jet recorder according to claim 14, wherein said means for selectively altering the orientation of the ejection end of said capillary in one of the orthogonal directions includes:

(a) a threaded aperture in said capillary housing;

(b) a threaded pin mounted in said aperture with lower portion contacting said capillary holder and the upper portion extending through said capillary housing;

(c) a flexible member secured at one end to said capillary housing extending between said capillary holder and said pin;

(d) pivot means pivotally securing said capillary holder within said capillary housing so that when said pin is rotated said capillary holder is pivoted on the pivot point defined by said pivot means such that the ejection end of said capillary is moved transverse to the longitudinal axis of said capillary housing.

18. An ink jet recorder according to claim 14, wherein said means for selectively altering the orientation of the ejection end of said capillary includes:

(a) an aperture in said capillary housing;

(b) an elongated cavity in said capillary holder in a direction parallel with the longitudinal axis of said capillary housing and opposite said aperture in said capillary housing;

(c) an eccentric pin having a stump portion fitted within said aperture and the eccentric portion of said pin extending from said stump portion and into said elongated cavity, and said eccentric portion being rotatably fitted within the elongated cavity of said capillary holder;
(d) first pivot means positioning said capillary holder within said capillary housing such that, when said eccentric pin is rotated, said nozzle unit is pivoted on the pivot point defined by said pivot means whereby the ejection end of said capillary is moved in a transverse direction to the longitudinal direction of said capillary housing.
(e) a threaded aperture in said capillary housing;
(f) a threaded pin mounted in said aperture with the lower portion contacting said nozzle unit and the upper portion extending beyond said capillary housing, such that the longitudinal axis of said capillary housing, the central axis of said threaded pin and said eccentric pin are all in parallel planes;
(g) a spring secured in said housing contacting said capillary holder positioned to keep said capillary holder and said pin in contact with each other; and
(h) second pivot means provided for pivotally securing said capillary holder within said capillary housing so that as said pin is rotated with respect to said threaded aperture said capillary holder is pivoted on the pivot point defined by said pivot means whereby the ejection end of said capillary is moved in a transverse direction to the longitudinal direction of said capillary housing, thereby providing selective alteration of the orientation of the ejection end of said capillary in two orthogonal directions to the transverse axis of said capillary housing by rotation of said eccentric pin and said threaded pin.

19. An ink jet recorder according to claim 18, wherein said first pivot means includes a extending member on the inner wall of said capillary housing and contacting said capillary holder and a spring member positioned opposite said extending member urging said capillary holder into contact with said extending member such that the capillary holder pivots about said extending member and said second pivot means includes a nozzle holder secured to said capillary holder and having flanges resting on walls of oversized apertures in said capillary housing such that the capillary holder is pivoted on said flanges.

20. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit, a deflection unit positioned along said path, means for generating an electric field, through which said stream is directed, within said deflection unit and suction means, said recorder comprising:
(a) a mounting block having a reference surface;
(b) said deflection unit is positioned on said reference surface and includes a deflection electrode, a ground electrode, a knife edge, and supporting members for said deflection and ground electrodes;
(c) first and second passages disposed in said mounting block;
(d) corresponding first and second mating means in said mounting block and said deflection unit respectively, for positioning said deflection unit in an operative position on said reference surface;
(e) corresponding third and fourth mating means in said mounting block and said deflection unit respectively, for postioning said deflection unit in an operative position on said reference surface;
(f) a first conduit connecting said first passage with said suction means;
(g) a first and second vacuum guide having an inlet positioned to extract extraneous ink from said deflection electrodes and said ground electrode, respectively, and extending through said second and fourth mating means;
(h) a second conduit connecting said second passage with said second vacuum guide; and
(i) said first and second passage connecting to said first and second vacuum guide, respectively, such that the vacuum action of said suction means is thereby provided to remove extraneous ink from said deflection and ground electrode.

21. An ink jet recorder according to claim 20, wherein said deflection electrode and said ground electrode are composed of a porous electrically conductive material and said means for generating an electric field are two electrical conductors one of which connects a source with said deflection electrode and the other conductor connects said ground electrode to a ground potential, whereby an electric field is generated between said deflection electrode and said ground electrode.

22. An ink jet recorder according to claim 21, wherein said second and fourth mating means are hollow, male members extending from said base of said deflection unit and said first and third mating means are corresponding female apertures in said mounting block positioned to accept said male members.

23. An ink jet recorder according to claim 22, wherein said first and second vacuum guide extend through the hollow portion of said second and fourth mating means; and said first and second passages communicate with the cavity defined by said first and third female apertures so that the vacuum of said suction means is communicated to said deflection and ground electrode through said first female aperture and second male member and said third female aperture and fourth male member.

24. An ink jet recorder according to claim 23, further comprising a mist shield mounted on said deflection unit, said mist shield being composed of a porous electrically conductive material and having apertures to permit the passage of the undeflected portions of said ink streams, means for charging said mist shield such that extraneous ink is attracted thereto.

25. An ink jet recorder according to claim 24, further comprising:
(a) corresponding fifth female aperture and sixth hollow, male member;
(b) a third vacuum guide adapted for extracting extraneous ink from said mist shield having one end abutting said mist shield and the other end of said third vacuum guide extends through said sixth mating means;
(c) a third passage in said mounting block connected to said third vacuum guide; and
(d) a third conduit connecting said third passage with said suction means, thereby the action of said suction means is communicated to said mist shield.

26. An ink jet recorder according to claim 21, further comprising a mist shield mounted on said deflection unit, said mist shield being composed of a porous electrically conductive material and having apertures to permit the passage of the undeflected portions of said ink streams, means for charging said mist shield such that extraneous ink is attracted thereto.

27. An ink jet recorder according to claim 26, further comprising:
(a) corresponding fifth female aperture and sixth hollow, male member;
(b) a third vacuum guide adapted for extracting extraneous ink from said mist shield having one end abutting said mist shield and the other end of said third vacuum guide extends through said sixth mating means;
(c) said first conduit extends into said fifth female aperture to provide communication between said first conduit and said third vacuum guide.

28. An ink jet recorder according to claim 27, wherein said knife edge is secured along one edged to said ground electrode and extending upward from said ground electrode at an substantial angle adapted to deflect and inhibit ink deflected from said predetermined path and adapted to urge extraneous ink thereon toward said ground electrode.

29. An ink jet recorder according to claim 27, wherein said deflection unit is provided with tapered components adapted to urge extraneous ink thereon toward said deflection electrode, ground electrode, and mist shield.

30. An ink jet recorder according to claim 27, wherein said upper deflection holder is provided with sides tapered toward said deflection electrode.

31. An ink jet recorder according to claim 26 further comprising a cover secured to said upper deflection holder extending over said deflection electrode and to which one edge of said mist shield is secured, said cover having a downward extending member with a portion tapered to promote the migration of extraneous ink thereon toward said mist shield.

32. An ink jet recorder according to claim 21, further comprising spring actuated means for securing said deflection unit to said mounting block.

33. An ink jet recorder according to claim 21, further comprising
(a) a lever member pivotally appended to the side of said deflection unit;
(b) a spring positioned to urge the upper portion of said lever member away from said deflection assemby,
(c) a cavity in said mounting block,
(d) said lever member having a foot on its lower portion positioned to engage said cavity and thereby secure said deflection unit to said mounting block.

34. An ink jet recorder according to claim 33, wherein there are two lever members pivotally appended to opposite sides of said deflection unit; two springs each postioned to urge one of said lever members away from said deflection unit, two cavities positioned on opposite sides of said mounting block, each of said lever members having a foot on their lower portion positioned to engage said cavities and thereby secure said deflection unit to said mounting block.

35. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit, a deflection unit positioned along said path, means for generating an electric field, through which said stream is directed, within said deflection unit and suction means, said recorder comprising:
(a) a mounting block having a reference surface on said mounting block;
(b) said nozzle unit positioned on the reference surface;
(c) a first port in said mounting block for connecting said mounting block to a suction pump;
(d) said deflection unit, including a deflection electrode, a ground electrode, a knife edge, and supporting members for said deflection and ground electrodes, positioned on said reference surface;
(e) corresponding first and second mating means in said mounting block and said nozzle unit, respectively, for positioning said nozzle unit in an operative position on said reference surface;
(f) corresponding first and second keying means in said mounting block and said deflection unit respectively, for positioning said deflection unit in an operative position on said reference surface; and
(g) means for selectively altering the path of said ink stream in two directions orthogonal to the longitudinal axis of said nozzle unit by varying the orientation of the portion of said nozzle unit from which the ink is ejected.

36. An ink jet recorder according to claim 35, further comprising:
(a) a port disposed on said mounting block:
(b) a first conduit in said mounting block connecting said first port with said first mating means;
(c) a first vacuum guide in said nozzle unit having an inlet end in the region in which the ink is ejected from said nozzle unit; and
(d) a second conduit in said nozzle unit connecting an outlet end of said vacuum guide with said second mating means whereby said second conduit communicates with said first conduit and the suction pump is connected to said vacuum guide.

37. An ink jet recorder according to claim 36, further comprising:
(a) first and second passages disposed in said mounting block;
(b) corresponding third and fourth keying means in said mounting block and said deflection unit re-. spectively, for postioning said deflection unit in an operative position on said reference surface;
(c) said first and second passages connected at one end to said first and third keying means, respectively;
(d) a second and third vacuum guide having an inlet positioned to extract extraneous ink from said deflection electrode and said ground electrode, respectively, and extending through said second and fourth keying means such that said second and third vacuum guide communicates with said third conduit; and
(e) a third and fourth conduit connecting said first and second passages, respectively, with said suction means such that the vacuum action of said suction means is thereby provided to remove extraneous ink from said deflection and ground electrode.

38. An ink jet recorder according to claim 37, further comprising:
(a) a mist shield mounted on said deflection unit having apertures through which said path passes;
(b) said mist shield being electrically charged such that the extraneous ink is attracted thereto;

(c) corresponding fifth and sixth keying means in said mounting block and said deflection unit respectively, for positioning said deflection unit in an operative position on said reference surface;

(d) a fourth vacuum guide having an inlet positioned to extract extraneous ink from said mist shield and extending through said sixth keying means;

(e) a third passage disposed in said block;

(f) said fifth conduit connecting said suction means with said third passage; and (g) said third passage communicates with said fourth vacuum guide, thereby communicating the action of said suction means to said mist shield.

39. An ink jet recorder according to claim 38, further comprising: corresponding third and fourth mating means respectively in said mounting block and said nozzle unit for positioning said nozzle unit in its operative position on said reference surface and wherein said means for selectively charging the ink includes a first electrical contact positioned within said fourth mating means secured to an electrically conductive portion of said nozzle unit which contacts said ink, a second electrical contact positioned within said third mating member contacting said first contact, a selectively controllable switching means connecting said second contact with a source and a ground potential, such that an electrical charge can be selectively imparted to and removed from said ink in said nozzle unit according to the state of said switching means.

40. An ink jet recorder according to claim 39, wherein said first, third, and fifth keying members are apertures provided in said mounting block, said second, fourth and sixth keying members are hollow, male members extending downward from said deflection unit and correspond with said first, third and fifth keying members, respectively, said first and third mating members are apertures provided in said mounting block, and said second and fourth mating members are hollow, male members extending downward from said nozzle unit and correspond with said first and third mating members.

41. An ink jet recorder according to claim 40 wherein the supporting components of said deflection unit are provided with tapered faces adapted for urging extraneous ink forming thereon to be urged and directed to said ground electrode, said deflection electrode and said mist shield.

42. An ink jet recorder according to claim 35, wherein said nozzle unit includes an outer capillary housing, a capillary holder positioned within said capillary housing and a capillary secured within said capillary holder, said capillary having an ejection end from which said ink stream is ejected and said altering means alter the orientation of said ejection end.

43. An ink jet recorder according to claim 42, wherein said means for selectively altering the orientation of the ejection end of said capillary in one of the orthogonal directions includes:

(a) a aperture in said capillary housing;

(b) a first elongated slot in said capillary holder in a direction parallel with the longitudinal axis of said capillary housing and opposite said capillary aperture;

(c) an eccentric pin having a stump portion fitted within said aperture and the eccentric portion of said pin extending from said stump portion rotatably fitted within said elongated slot;

(d) pivot means positioning said capillary holder within said capillary housing such that, when said eccentric pin is rotated, said capillary holder is pivoted on the pivot point defined by said pivot means and thereby the ejection end of said capillary is moved transverse to the longitudinal axis of said capillary housing.

44. An ink jet recorder according to claim 43, wherein said means for selectively altering the orientation of the ejection end of said capillary in one of the orthogonal directions further includes:

(a) a second elongated slot in said capillary holder positioned on an adjacent face to said first slot forming a L-shaped cavity in said holder with said first slot and a flexible wall between said first and second slot which exerts a compression force on said pin.

45. An ink jet recorder according to claim 44, wherein said means for selectively altering the orientation of the ejection end of said capillary in one of the orthogonal directions includes:

(a) a threaded aperture in said capillary housing;

(b) a threaded pin mounted in said aperture with lower portion contacting said capillary holder and the upper portion extending through said capillary housing;

(c) a flexible member secured at one end to said capillary housing extending between said capillary holder and said pin;

(d) pivot means pivotally securing said capillary holder within said capillary housing so that when said pin is rotated said capillary holder is pivoted on the pivot point defined by said pivot means such that the ejection end of said capillary is moved transverse to the longitudinal axis of said capillary housing.

46. An ink jet recorder according to claim 42, wherein said means for selectively altering the orientation of the ejection end of said capillary includes:

(a) an aperture in said capillary housing;

(b) an elongated cavity in said capillary holder in a direction parallel with the longitudinal axis of said capillary housing and opposite said aperture in said capillary housing;

(c) an eccentric pin having a stump portion fitted within said aperture and the eccentric portion of said pin extending from said stump portion and into said elongated cavity, and said eccentric portion being rotatably fitted within the elongated cavity of said capillary holder;

(d) first pivot means positioning said capillary holder within said capillary housing such that, when said eccentric pin is rotated, said nozzle unit is pivoted on the pivot point defined by said pivot means whereby the ejection end of said capillary is moved in a transverse direction to the longitudinal direction of said capillary housing;

(e) a threaded aperture in said capillary housing;

(f) a threaded pin mounted in said aperture with the lower portion contacting said nozzle unit and the upper portion extending beyond said capillary housing, such that the longitudinal axis of said capillary housing, the central axis of said threaded pin and said eccentric pin are all in parallel planes;

(g) a spring secured in said housing contacting said capillary holder positioned to keep said capillary holder and said pin in contact with each other; and (h) second pivot means provided for pivotally securing said capillary holder within said capillary housing to that as said pin is rotated with respect to said threaded aperture said capillary holder is pivoted on the pivot point defined by said second pivot means whereby the ejection end of said capillary is moved in a second transverse direction to the longitudinal axis of said capillary housing which is perpendicular to the first transverse direction, thereby providing selective alteration of the orientation of the ejection end of said capillary in two orthogonal directions to the transverse axis of said capillary housing by rotation of said eccentric pin and said threaded pin.

47. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit and means for deflecting charged ink from said path, said recorder comprising:
(a) a mounting block having a reference surface;
(b) corresponding first and second mating means in said mounting block and said nozzle unit, respectively, for positioning said nozzle unit in an operative position on said reference surface;
(c) a vacuum guide in said nozzle unit having an inlet end in the region in which the ink is ejected from said nozzle unit; and
(d) means connecting said vacuum guide to a suction pump such that the suction pump is connected to said vacuum guide through said said first and second mating means.

48. An ink jet recorder according to claim 47 further comprising third and fourth mating means, wherein said means for selectively charging said ink includes an electrical conductor connected to an electrically conductive portion of said nozzle unit contacting the ink therein so that the ink therein can be charged by application of a suitable electrical potential to said conductor and a selectively controllable switching means for connecting said electrical conductor with a source and a ground potential such that said electrical conductor and said switching means are connected through said third and fourth mating means.

49. An ink jet recorder according to claim 47, further comprising means for releasably clamping said nozzle unit to said mounting block, said clamping means including:
(a) a cavity in said mounting block extending downward from said reference surface of said mounting block;
(b) an arm fixed to said nozzle unit and extending in to said cavity and generally parallel with said reference surface;
(c) an elongated tubular member extending through said mounting block and having a cam portion positioned within said cavity;
(d) said tubular member being rotatable between a first and second position; and
(e) the cam portion of said tubular member when in said first position engages said arm and thereby clamps said nozzle unit to the reference surface of said mounting block, and when said cam portion is in said second position said nozzle unit is released from said mounting block.

50. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit, a deflection unit positioned along said path, means for generating an electric field, through which said stream is directed, within said deflection unit and suction means, said recorder comprising:
(a) a mounting block having a reference surface;
(b) said deflection unit is positioned on said reference surface and includes a deflection electrode, a ground electrode, a knife edge, and supporting members for said deflection and ground electrodes;
(c) corresponding first and second mating means in said mounting block and said deflection unit respectively, for positioning said deflection unit in an operative position on said referene surface;
(d) corresponding third and fourth mating means in said mounting block and said deflection unit respectively, for positioning said deflection unit in an operative position on said reference surface;
(e) a first and second vacuum guide having an inlet positioned to extract extraneous ink from said deflection electrodes and said ground electrode, respectively, and extending through said second and fourth mating means; and
(f) first and second passages connecting said first and third mating means to said suction means, respectively, such that the vacuum action of said suction means is provided to remove extraneous ink from said deflection and ground electrode through said first and second mating means and said third and fourth mating means, respectively.

51. An ink jet recorder according to claim 50 wherein said first and second vacuum guide extend through the hollow portion of said second and fourth mating means; and said first and second passages communicate with the cavity defined by said first and third female apertures so that the vacuum of said suction means is communicated to said deflection through said first female aperture and second male member and to said ground electrode through said third female aperture and fourth male member.

52. An ink jet recorder according to claim 51, further comprising:
(a) a mist shield mounted on said deflection unit;
(b) fifth and sixth mating means in said mounting block and said deflection unit, respectively, for positioning said deflection unit in an operative position on said reference surface, wherein said fifth and six mating means are a corresponding a fifth female aperture and a sixth hollow, male member;
(c) a third vacuum guide adapted for extracting extraneous ink from said mist shield having one end abutting said mist shield and the other end of said third vacuum guide extends through said sixth male member; and
(d) a third passage connecting said fifth female member with said suction means, such that the action of said suction means is communicated to said mist shield through said fifth female aperture and said sixth male member.

53. An ink jet recorder adapted for pressure ejecting a fine ink stream along a predetermined path to a recording surface, said recorder being of the type having, a nozzle unit from which said ink stream is ejected toward the recording surface, an ink reservoir supplying electrically conductive ink to said nozzle unit, means for selectively charging the ink projected from said nozzle unit, a deflection unit positioned along said path, means for generating an electric field, through which said stream is directed, within said deflection unit and suction means, said recorder comprising:

(a) a mounting block having a reference surface;
(b) said nozzle unit positioned on the reference surface;
(c) said deflection unit, including a deflection electrode, a ground electrode, a knife edge, and supporting members for said deflection and ground electrodes, positioned on said reference surface;
(d) corresponding first and second mating means in said mounting block and said nozzle unit, respectively, for positioning said nozzle unit in an operative position on said reference surface;
(e) corresponding first and second keying means in said mounting block and said deflection unit respectively, for positioning said deflection unit in an operative position on said reference surface; and
(f) means for selectively altering the path of said ink stream in two directions ortogonal to the longitudinal axis of said nozzle unit by varying the orientation of the portion of the nozzle unit from which the ink is ejected.

54. An ink jet recorder according to claim 53, further comprising:

(a) a first conduit connecting said suction means with said first mating means;

(b) a first vacuum guide in said nozzle unit having an inlet end in the region in which the ink is ejected from said nozzle unit and an outlet in said second mating mean whereby the action of said suction means is communicated through said mating means to the region in which the ink is ejected from said nozzle unit;
(c) a mist shield mounted on said deflection unit having apertures through which said path passes;
(d) said mist shield being electrically charged such that the extraneous ink is attracted thereto;
(e) first and second passages disposed in said mounting block;
(d) corresponding third and fourth and fifth and sixth keying means in said mounting block and said deflection unit respectively, for positioning said deflection unit in an operative position on said reference surface;
(e) a third passage conected at one end to said fifth keying means and at the other end to said suction means;
(f) said first and second passages connected at one end to said first and third keying means, respectively and at the other end to said suction means; and
(g) a second, third and fourth vacuum guide having an inlet positioned to extract extraneous ink from said deflection electrode, said ground electrode, and said mist shield, respectively, and extending through said second, fourth, and sixth keying means such that said second, third, and fourth vacuum guide communicates with said first and second passages when said deflection unit is in the operative position.

* * * * *